(12) United States Patent
Welchko

(10) Patent No.: US 7,714,461 B2
(45) Date of Patent: May 11, 2010

(54) APPARATUS AND METHODS FOR REDUCING RESONANCE IN MULTIPLE INVERTER SYSTEMS

(75) Inventor: Brian A. Welchko, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 275 days.

(21) Appl. No.: 11/874,066

(22) Filed: Oct. 17, 2007

(65) Prior Publication Data
US 2009/0102286 A1   Apr. 23, 2009

(51) Int. Cl.
*H02J 3/14* (2006.01)
*H02J 3/02* (2006.01)

(52) U.S. Cl. .............................. 307/38; 307/20; 307/21; 307/27; 307/82; 307/151

(58) Field of Classification Search .................. 307/11, 307/12, 13, 19, 20, 21, 27, 38, 39, 82, 151
See application file for complete search history.

(56) References Cited

U.S. PATENT DOCUMENTS

| | | | | |
|---|---|---|---|---|
| 5,365,153 A | * | 11/1994 | Fujita et al. ..................... | 318/34 |
| 5,434,770 A | * | 7/1995 | Dreifuerst et al. .............. | 363/65 |
| 7,012,392 B2 | * | 3/2006 | Nguyen et al. ............... | 318/376 |
| 7,084,525 B2 | * | 8/2006 | Rajashekara et al. .......... | 307/82 |
| 7,405,526 B2 | * | 7/2008 | Sato ........................... | 318/139 |
| 2009/0027933 A1 | * | 1/2009 | Kajouke et al. ............... | 363/97 |

* cited by examiner

*Primary Examiner*—Jared J Fureman
*Assistant Examiner*—Hal I Kaplan
(74) *Attorney, Agent, or Firm*—Ingrassia Fisher & Lorenz, P.C.

(57) ABSTRACT

Apparatus, systems, and methods for reducing resonance in a multiple inverter system are provided. One apparatus includes an inverter coupled to a decoupling element, wherein the inverter and the decoupling elements are couplable to a power source. A system includes a motor vehicle power source including first positive and negative terminals, and a plurality of inverters coupled to the power source. Each inverter includes a second positive terminal coupled to the first positive terminal and a second negative terminal coupled to the first negative terminal. A first inverter of the plurality of inverters includes a decoupling element coupled between the first positive terminal and the positive terminal of the first inverter. One method includes operating first and second inverters at different frequencies, and controlling the impedance of a decoupling element coupled between a power source and the first inverter based on the second inverter frequency.

19 Claims, 8 Drawing Sheets

APPARATUS AND METHODS FOR REDUCING RESONANCE IN MULTIPLE INVERTER SYSTEMS

TECHNICAL FIELD

The present invention generally relates to inverters, and more particularly relates to methods and apparatus for reducing resonance in multiple inverter systems.

BACKGROUND OF THE INVENTION

Many electric drive systems employ multiple inverters that power multiple electric motors while sharing a common DC link power source. Typically, these electric drive systems are designed so that the natural resonant frequency of each inverter is the same so that any given inverter does not excite a resonance in any of the other inverters. While this is a convenient design because the inverters are essentially uncoupled, it can significantly impact system costs.

Accordingly, it is desirable to provide multiple inverter systems that do not consider neighboring inverter operation and/or resonant frequencies, and that can be more cost-effective. In addition, it is desirable to provide methods for enabling two or more inverters in a multiple inverter system to operate at different frequencies. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Various embodiments of the invention provide apparatus, systems, and methods for reducing resonance in a multiple inverter system. One apparatus for reducing resonance in a multiple inverter system having a power source including a first positive terminal and a first negative terminal comprises an inverter having a second positive terminal and a second negative terminal, the second negative terminal being couplable to the first negative terminal. The apparatus also comprises a decoupling element coupled to the second positive terminal and couplable to the first positive terminal.

A system with reduced resonance comprises a motor vehicle power source including a first positive terminal and a first negative terminal, and a plurality of inverters coupled to the power source. Each inverter comprises a second positive terminal coupled to the first positive terminal and a second negative terminal coupled to the first negative terminal, and a first inverter of the plurality of inverters further comprises a decoupling element coupled between the first positive terminal and the second positive terminal of the first inverter.

A method for reducing resonance in a system comprising a plurality of inverters, a first inverter comprising a first decoupling element having a variable first impedance and a second inverter coupled to the first inverter, the method comprising the step of operating the first and second inverters at different frequencies. The method also comprises the step of controlling the first impedance based on a frequency of the second inverter.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
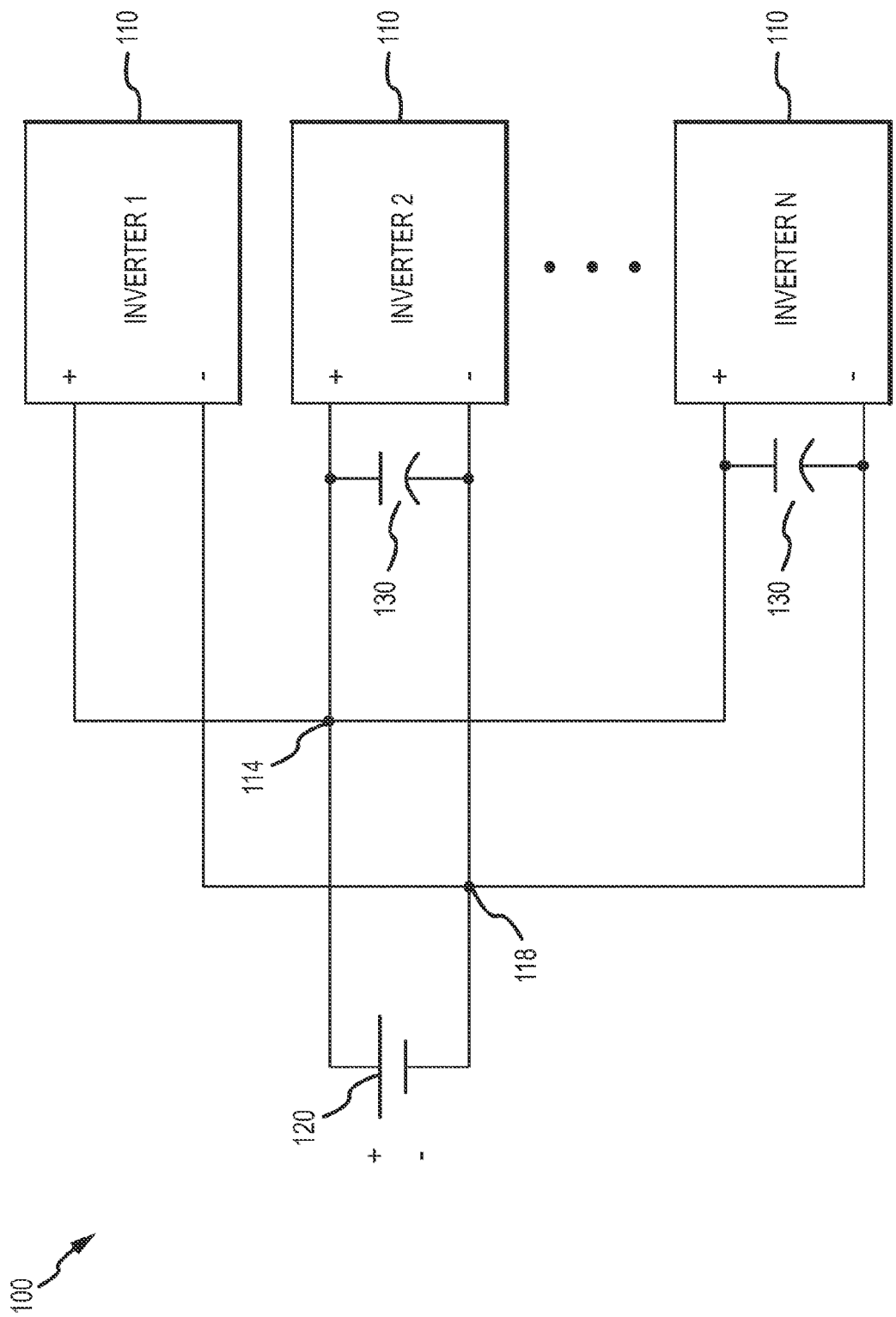
FIG. 1 is a block diagram of a prior art multiple inverter system.

FIG. 1 is a block diagram of a conventional multiple inverter system 100 including a plurality of inverters 110. Each inverter 110 in system 100 is coupled to a main, or common, DC link 120 via two nodes 114 (coupled to the positive terminal of DC link 120) and 118 (coupled to the negative terminal of DC link 120).

As illustrated in FIG. 1, two or more inverters 110 (e.g., the $1^{st}$ and $2^{nd}$ inverters 110) share a common local DC link 130. Alternatively, each inverter 110 may employ a local DC link 130, a subset of inverters 110 may include a local DC link 130, or a single inverter 110 may include a local DC link 130. As such, any number of local DC links 130 may be employed in system 100. Local DC links 130 commonly include one or more capacitive elements (e.g., one or more capacitors), while main DC link 120 commonly employs one or more bulk energy storage elements such as, for example, one or more batteries, one or more fuel cells, and/or one or more supercapacitors.

As discussed above, each inverter 110 is designed to operate at the same frequency, but there are times when two or more inverters 110 may need to operate at different frequencies to produce a plurality of power levels or voltage outputs. Furthermore, each inverter 110 may be physically located a different distance from main DC link 120. As a result, the natural system resonant frequency of each inverter 110 (which can be determined from the capacitance of its local DC link 130), along with local inverter operating frequencies and line inductance (which connects the local DC link 130 to the main DC link 120) may be different for each inverter 110 of system 100, and may interfere with the operation of one or more other inverters 110.

Figure 2:
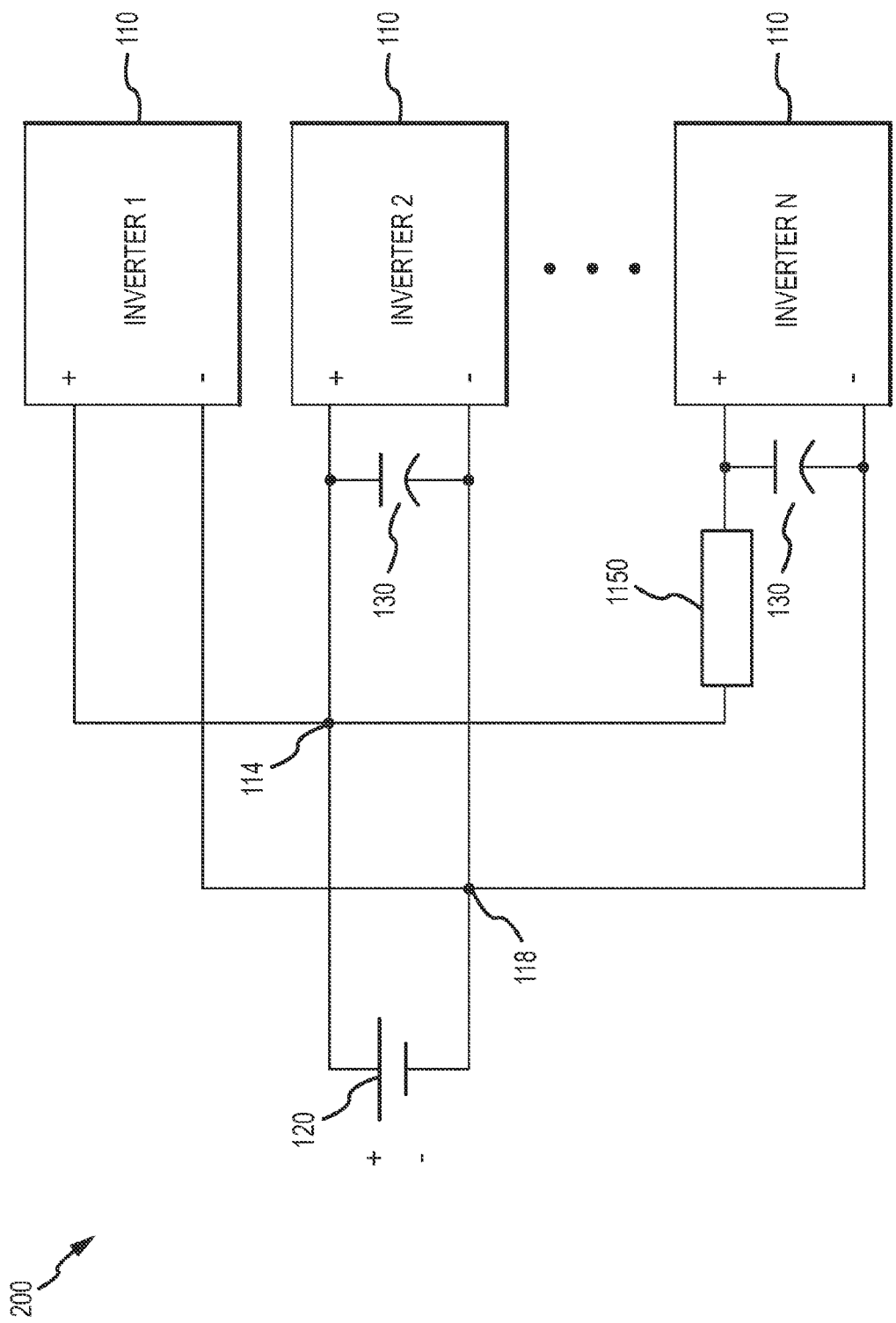
FIG. 2 is a block diagram of one exemplary embodiment of a multiple inverter system including reduced resonance.

FIG. 2 is a block diagram illustrating one exemplary embodiment of a multiple inverter system 200 with reduced resonance. System 200 comprises a plurality of inverters 110 capable of operating at different frequencies from one another. As illustrated in FIG. 2, each inverter 110 is coupled to main DC link 120, which may be a power source or battery for a motor vehicle, via nodes 114 and 118 similar to system 100 discussed above with respect to FIG. 1. Furthermore, one or more inverters 110 may comprise a local DC link 130 (see the $N^{th}$ inverter 110) and/or two or more inverters 110 may share a common local DC link 130 (see the $1^{st}$ and $2^{nd}$ inverters 110).

In accordance with one exemplary embodiment, system 200 comprises a decoupling element 1150 coupled between a positive terminal of one inverter 110 and node 114. In the embodiment illustrated in FIG. 2, decoupling element 1150 is coupled to the $N^{th}$ inverter 110; however, decoupling element 1150 may be coupled to the $1^{st}$ inverter 110, the $2^{nd}$ inverter 110, or any inverter 110 in between the $1^{st}$ and $N^{th}$ inverter 110. In one embodiment, decoupling element 1150 is coupled to the inverter 110 that is operating at the lowest frequency or is producing the least amount of voltage output. In another embodiment, decoupling element 1150 is coupled to an inverter 110 having a low frequency or voltage output so that one or more inverters 110 are operating at a greater frequency and one or more inverters 110 are operating at a lower frequency than the inverter 110 decoupling element 1150 is coupled to. For efficiency reasons, decoupling element 1150 should not be coupled to the inverter 110 producing the greatest amount of power; however, various embodiments do contemplate that decoupling element 1150 is coupled to the inverter 110 producing the greatest amount of power.

Figure 3:
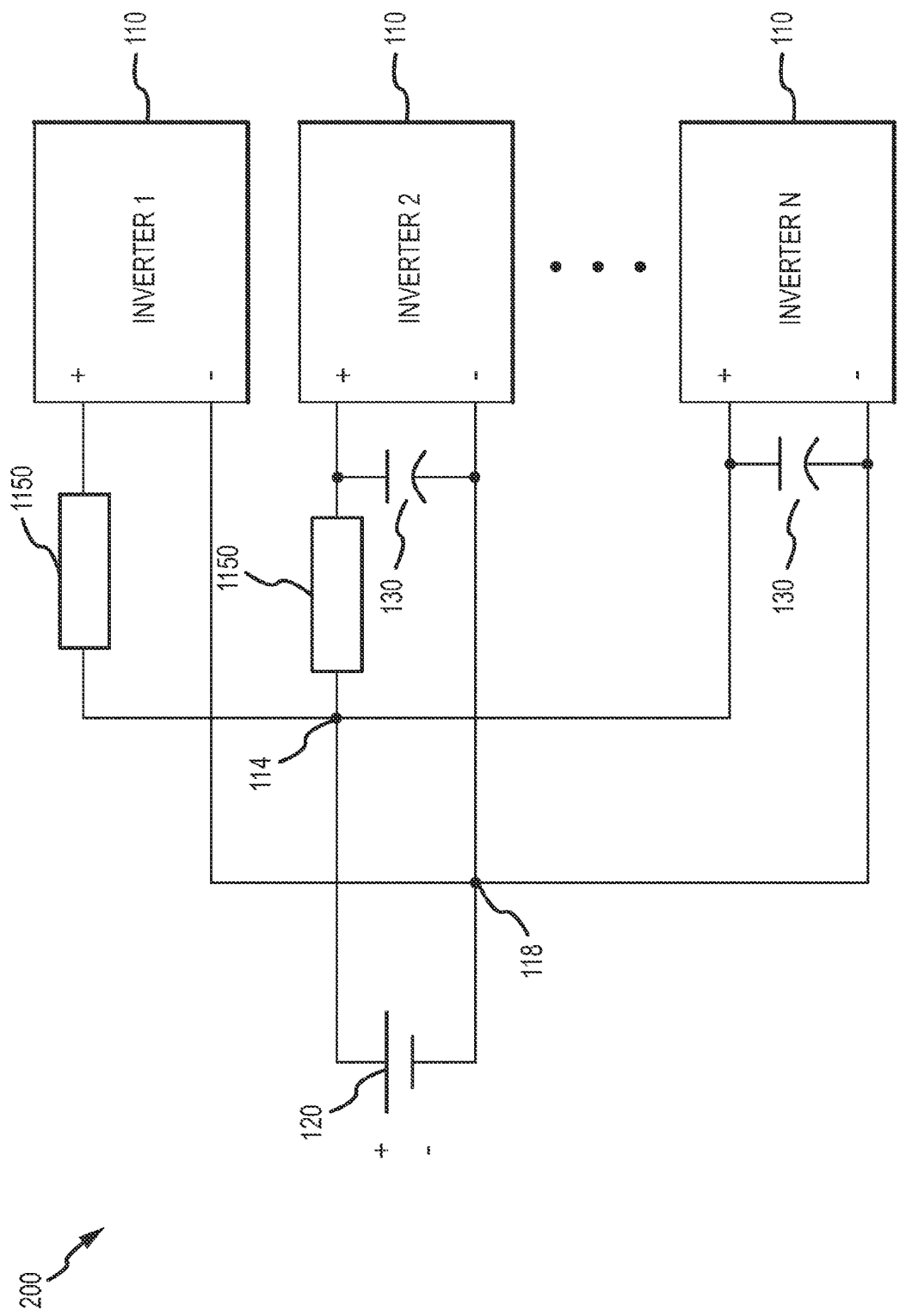
FIG. 3 is a block diagram of another exemplary embodiment of a multiple inverter system including reduced resonance.

In accordance with another exemplary embodiment of the invention illustrated in FIG. 3, at least two inverters 110 comprise a decoupling element 1150 coupled between a positive terminal of each inverter 110 and node 114. Although FIG. 3 shows the $1^{st}$ and $2^{nd}$ inverters 110 comprising decoupling element 1150, any two or more inverters 110 may comprise a decoupling element 1150.

Figure 4:
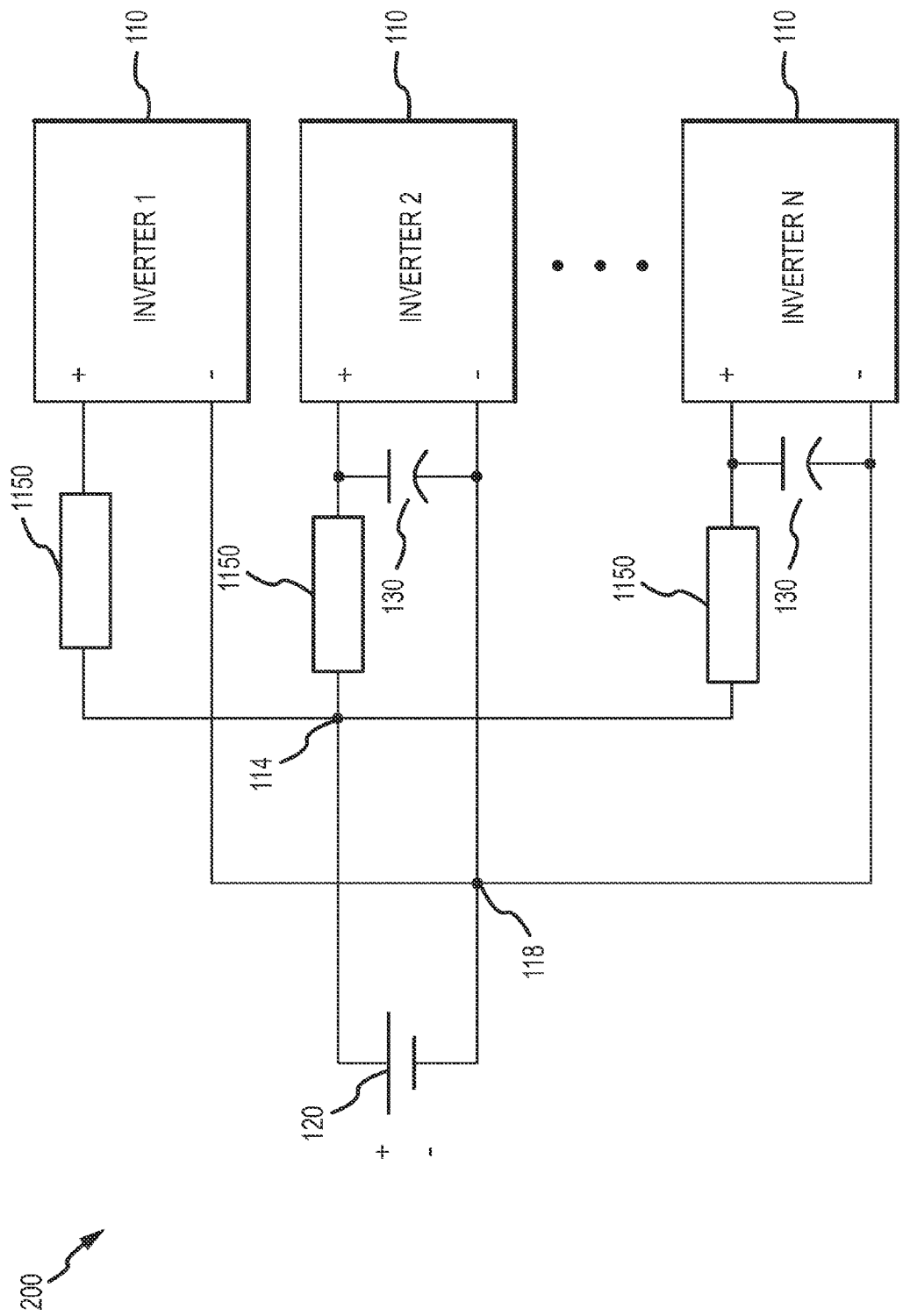
FIG. 4 is a block diagram of yet another exemplary embodiment of a multiple inverter system including reduced resonance.

FIG. 4 illustrates yet another exemplary embodiment of system 200. In this embodiment, each inverter 110 comprises a decoupling element 1150 coupled between each respective positive terminal of inverters 110 and node 114.

Decoupling element(s) 1150 may be any hardware, software, and/or device having a variable impedance. In accordance with one exemplary embodiment illustrated in FIG. 5, at least one decoupling element 1150 is a diode 1152. In this embodiment, the anode of diode 1152 is coupled or couplable (i.e., capable of being coupled) to node 114, while the cathode of diode 1152 is coupled or couplable to the positive terminal of its inverter 110 (the $N^{th}$ inverter 110 in this example).

Figure 6:
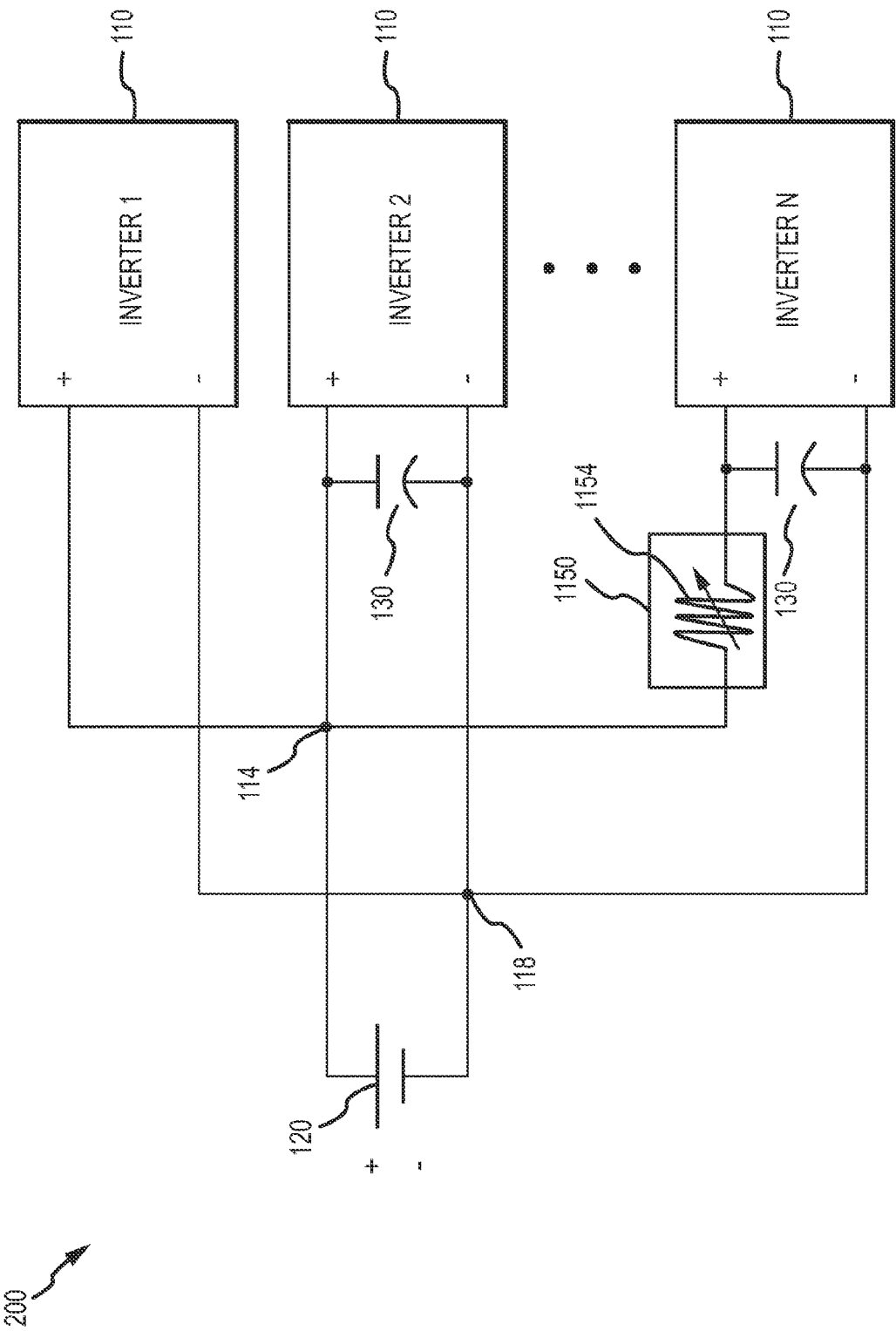
FIG. 6 is a block diagram of the system of FIG. 2 comprising a decoupling element comprised of a braking resistor or potentiometer.

In another exemplary embodiment illustrated in FIG. 6, at least one decoupling element 1150 is a braking resistor or a potentiometer 1154 coupled between node 114 and its respective inverter 110. In yet another embodiment illustrated in FIG. 7, at least one decoupling element 1150 is a semiconductor switch 1158 (e.g., a field effect transistor (FET), bipolar junction transistor (BJT), etc.) comprising an anti-parallel diode 1160 coupled between node 114 and its respective inverter 110.

Figure 5:
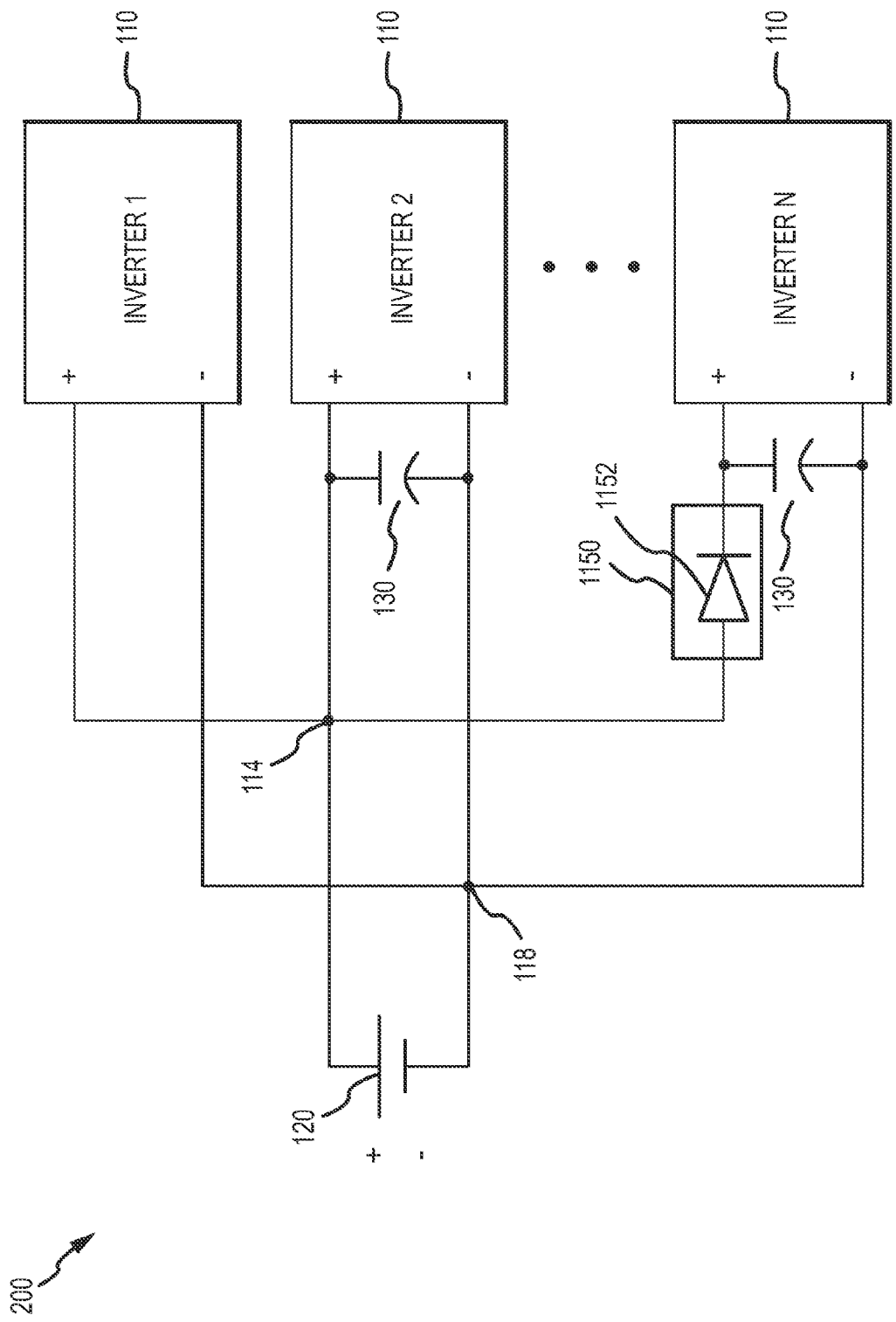
FIG. 5 is a block diagram of the system of FIG. 2 comprising a decoupling element comprised of a diode.
Figure 7:
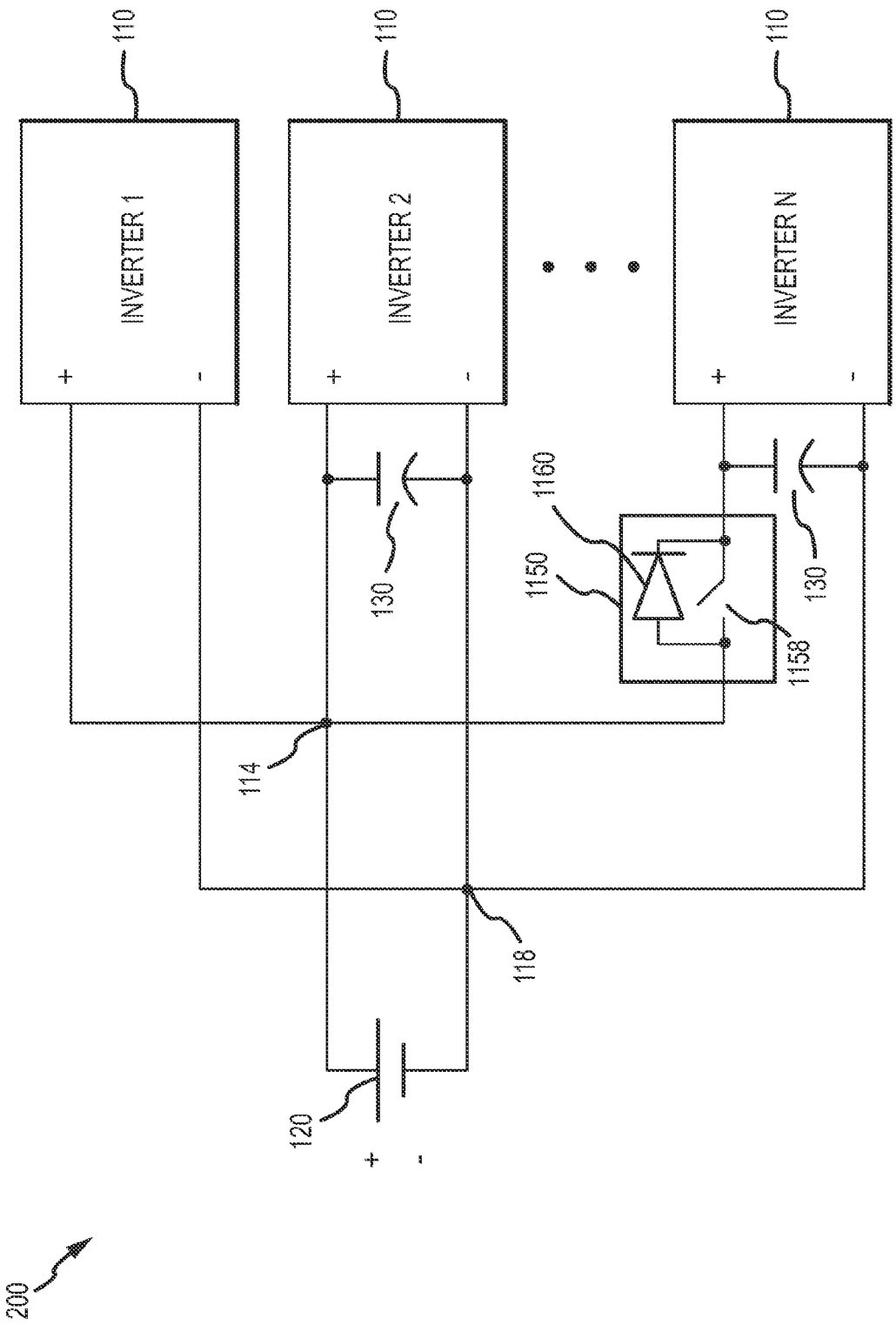
FIG. 7 is a block diagram of the system of FIG. 2 comprising a decoupling element comprised of a semiconductor switch and an anti-parallel diode.

Although FIGS. 5-7 illustrate embodiments similar to the embodiment illustrated in FIG. 2, various other embodiments contemplate that each of the decoupling elements 1150 of FIGS. 3 and 4 may be a diode 1152, a braking resistor 1154, a potentiometer 1156, and/or a switch 1158 with an anti-parallel diode 1160 coupled to it. Furthermore, embodiments of system 200 may comprise any combination of a diode 1152, a braking resistor 1154, a potentiometer 1156, and/or a switch 1158 with an anti-parallel diode 1160 coupled to it. That is, each decoupling element 1150 may be the same type of element, each decoupling element 1150 may be a different type of element, or at least two decoupling elements 1150 are different types of elements from one another.

Figure 8:
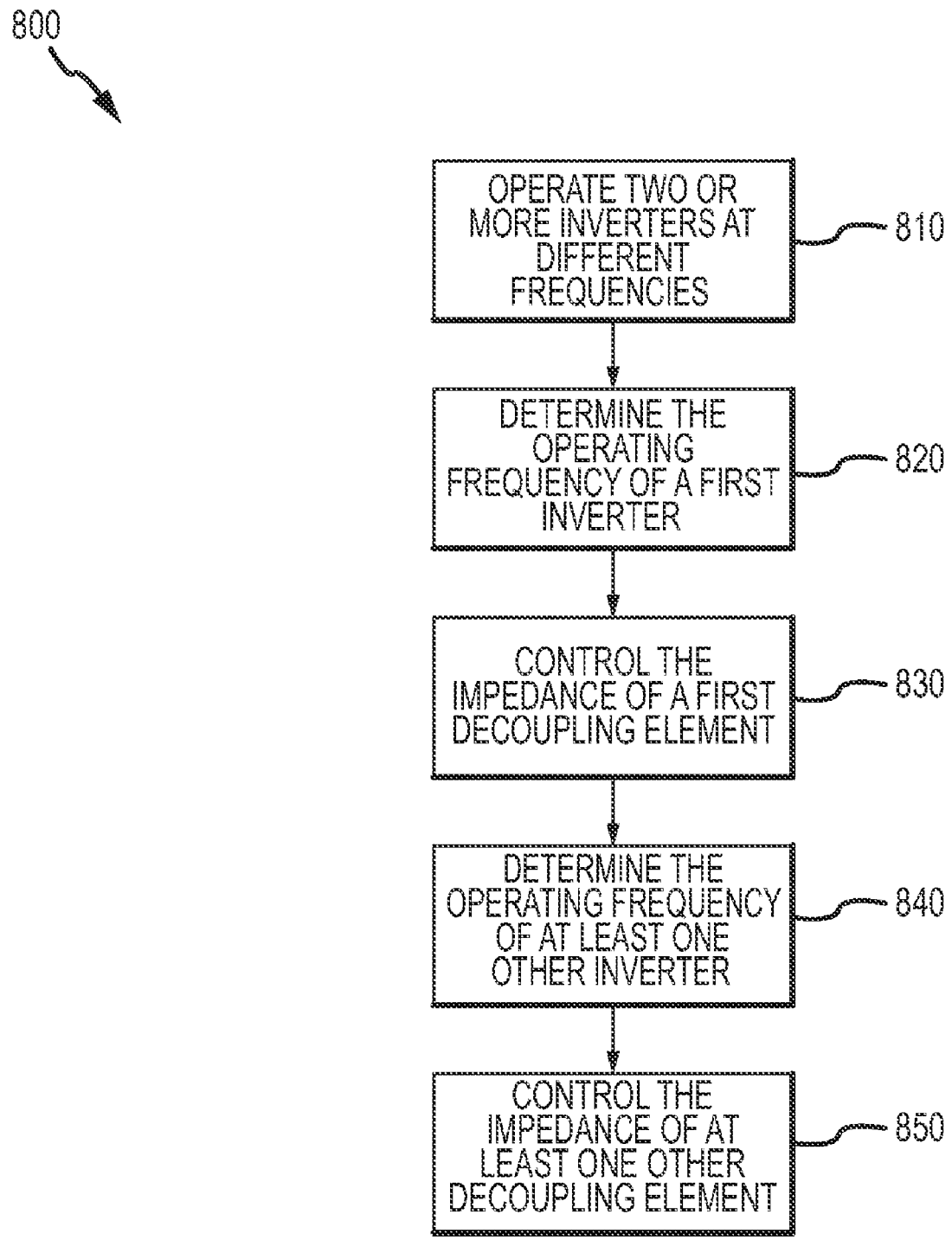
FIG. 8 is a block diagram of one exemplary embodiment of a multiple inverter system including reduced resonance.

FIG. 8 is a flow diagram of one exemplary embodiment of a method 800 for reducing resonance in a multiple inverter system (e.g., system 200). In accordance with one exemplary embodiment, method 800 begins by operating two or more inverters (e.g., inverters 110) at different frequencies to produce different amounts of power or output voltages (step 810).

The operating frequency of an inverter 110 is determined (step 820) and the impedance of a first variable impedance decoupling element (e.g., decoupling element 1150) is controlled and/or adjusted based on the operating frequency of the one or more other inverters 110 (step 830). In one embodiment, the impedance of decoupling element 1150 is controlled or adjusted based on the operating frequency of a single inverter 110. In another embodiment, the impedance of decoupling element 1150 is controlled or adjusted based on the operating frequencies of at least two inverters 110 in a system (e.g., system 200). In yet another embodiment, the impedance of decoupling element 1150 is controlled or adjusted based on the operating frequencies of each of the other inverters 110 in system 200.

Method 800 also comprises determining the operating frequency of one or more other inverters 110 (step 840) and controlling or adjusting the impedance of one or more other variable impedance decoupling elements based on the operating frequency of the one or more other inverters 110 (step 850). In one embodiment, the impedance of each decoupling element 1150 is controlled or adjusted based on the operating frequency of a single inverter 110. In another embodiment, the impedance of each decoupling element 1150 is controlled or adjusted based on the operating frequencies of at least two inverters 110 in system 200. In yet another embodiment, the impedance of each decoupling element 1150 is controlled or adjusted based on the operating frequencies of each of the other inverters 110 in system 200.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. An apparatus for reducing resonance in a multiple inverter system having a power source including a first positive terminal and a first negative terminal, the apparatus comprising:
   a first inverter having a second positive terminal and a second negative terminal, the second positive terminal couplable to the first positive terminal, the second negative terminal couplable to the first negative terminal;
   a second inverter having a third positive terminal and a third negative terminal, the third positive terminal couplable to the first positive terminal, and the third negative terminal couplable to the first negative terminal; and
   a decoupling element coupled to the second positive terminal and couplable to the first positive terminal, the decoupling element having a variable impedance, wherein the first and second inverters are configured for operation at different frequencies, and wherein the variable impedance is adjusted based on an operating frequency of the second inverter.

2. The apparatus of claim 1, wherein the decoupling element is a diode having an anode couplable to the first positive terminal and a cathode coupled to the second positive terminal.

3. The apparatus of claim 1, wherein the decoupling element is a braking resistor.

4. The apparatus of claim 1, wherein the decoupling element is a switch.

5. The apparatus of claim 4, wherein the switch is a semiconductor switch comprising an anti-parallel diode.

6. A system with reduced resonance, comprising:
  a motor vehicle power source including a first positive terminal and a first negative terminal; and
  a plurality of inverters coupled electrically in parallel to the power source, the plurality of inverters being controlled for operation at different frequencies, wherein a first inverter of the plurality of inverters further comprises a decoupling element coupled to the first positive terminal, and wherein the decoupling element has a variable impedance that is adjusted based on the respective operating frequency of at least one of the plurality of inverters, other than the first inverter.

7. The system of claim 6, wherein a portion of the plurality of inverters further comprise a decoupling element coupled between the first positive terminal and each respective second positive terminal of the portion of the plurality of inverters.

8. The system of claim 7, wherein at least two of the decoupling elements are different from one another.

9. The system of claim 7, wherein each of the decoupling elements are the same type of element.

10. The system of claim 6, wherein each of the plurality of inverters further comprise a decoupling element coupled between the first positive terminal and each respective second positive terminal.

11. The system of claim 6, wherein a second inverter of the plurality of inverters produces a greater voltage output than the first inverter.

12. The system of claim 6, wherein the first inverter produces a smaller voltage output than each of the other plurality of inverters.

13. The system of claim 6, wherein the decoupling element is a diode having an anode couplable to the first positive terminal and a cathode coupled to the second positive terminal of the first inverter.

14. The apparatus of claim 6, wherein the decoupling element is a braking resistor.

15. The apparatus of claim 6, wherein the decoupling element is a switch.

16. The apparatus of claim 15, wherein the switch is a semiconductor switch comprising an anti-parallel diode.

17. A method for reducing resonance in a system comprising a plurality of inverters, a first inverter comprising a first decoupling element having a variable first impedance and a second inverter coupled to the first inverter, the method comprising the steps of:
  operating the first and second inverters at different frequencies; and
  controlling the first impedance based on a frequency of the second inverter.

18. The method of claim 17, wherein the controlling step comprises the step of adjusting the first impedance based on the frequency of the second inverter and further based on a frequency of at least one of the remaining inverters of the plurality of inverters.

19. The method of claim 17, wherein the second inverter comprises a second decoupling element having a variable second impedance, the method further comprising the step of controlling the second impedance based on a frequency of the first inverter.

* * * * *